United States Patent
Fung et al.

(10) Patent No.: US 6,658,148 B1
(45) Date of Patent: Dec. 2, 2003

(54) IMAGE PROCESSING METHOD AND APPARATUS

(75) Inventors: Peter Fung, Mountain View, CA (US); Akira Yabuta, Hyogo (JP); Nobuaki Kadowaki, Osaka (JP); Kazutaka Ikeda, Nara (JP); Jun Nishijima, Osaka (JP)

(73) Assignee: Matsushita Electric Works, Ltd., Osaka (JP)

(*) Notice: Subject to any disclaimer, the term of this patent is extended or adjusted under 35 U.S.C. 154(b) by 532 days.

(21) Appl. No.: 09/588,416

(22) Filed: Jun. 6, 2000

(51) Int. Cl.[7] ................................................. G06K 9/62
(52) U.S. Cl. ........................ 382/209; 382/217; 382/232
(58) Field of Search ................................. 382/103, 181, 382/209, 218, 219, 232, 233, 235, 239, 240, 243, 278, 305, 217; 348/169, 384.1, 387.1, 390.1; 358/426.01; 375/240, 240.02, 240.08, 240.11

(56) References Cited

U.S. PATENT DOCUMENTS

| | | | | |
|---|---|---|---|---|
| 5,303,313 A | * | 4/1994 | Mark et al. | 382/235 |
| 5,757,965 A | * | 5/1998 | Ohki | 382/232 |
| 5,805,727 A | * | 9/1998 | Nakano | 382/195 |
| 5,933,546 A | * | 8/1999 | Stone | 382/278 |
| 6,222,940 B1 | * | 4/2001 | Wenzel et al. | 382/217 |
| 6,445,821 B1 | * | 9/2002 | Arai | 382/209 |
| 6,522,790 B1 | * | 2/2003 | Zhang et al. | 382/284 |

OTHER PUBLICATIONS

Amir, et al. "Efficient two dimensional compressed matching", IEEE, pp.279288, 1992.*

Inglis, et al. "Compression-based template matching", IEEE, pp.106–115, 1994.*

* cited by examiner

Primary Examiner—Daniel G. Mariam
(74) Attorney, Agent, or Firm—Muramatsu & Associates

(57) ABSTRACT

An image processing method and apparatus for detecting pattern matching between an input mage and a template image at high speed by reducing memory access times. The image processing apparatus includes a first memory for storing a reference pattern as a template, a second memory for storing an input image for which pattern matching with the template is to be detected, means for compressing the template from the first memory and the input image from the second memory by a predetermined compression ratio, a compressed data memory for storing the compressed input image and the compressed template from the compressing means, a main processor for computing inter-correlation between the compressed input image and the compressed template by scanning the compressed input image for each sub-block thereof and determining a location of the compressed input mage showing a best match in a current pattern matching mode. The current pattern matching mode is one of several matching modes with different degrees of compression ratio involved in the compression means and the inter-correlation is determined through two or more pattern matching modes in the order from higher compression ratio to lower compression ratio.

13 Claims, 19 Drawing Sheets

Fig. 2

| Mode | Template | Compressed Template | Input Image | Compressed Input Image | Compressed Ratio | Scan Iterations |
|---|---|---|---|---|---|---|
| A | 128 X 128 | 8 X 8 | 512 X 488 | 32 X 30 | 256 : 1 | 575 |
| B | 128 X 128 | 16 X 16 | 160 X 160 | 20 X 20 | 64 : 1 | 16 |
| C | 128 X 128 | 32 X 32 | 136 X 136 | 34 X 34 | 16 : 1 | 9 |
| D | 128 X 128 | 64 X 64 | 132 X 132 | 66 X 66 | 4 : 1 | 9 |
| E | 128 X 128 | 128 X 128 | 130 X 130 | 130 X 130 | 1 : 1 | 4 |

X Direction    Y Direction

IMAGE PROCESSING METHOD AND APPARATUS

FIELD OF THE INVENTION

This invention relates to an image processing method and apparatus to be applied to pattern recognition in factory automation and the like, and more particularly, to an image processing method and apparatus for performing pattern matching between an input image and a reference image or template by correlating between the two images.

BACKGROUND OF THE INVENTION

In one of the applications of an image processing apparatus, an input image having images of various patterns is compared with a reference image of predetermined pattern (hereafter "template") by a pattern matching technique for finding the bast match therebetween. The search is carried out by comparing the template to every possible sub-block of the input image with the same dimensions as the template. This search continues until the entire input image has been scanned and evaluated.

By matching the input image to the template, specific objects or targets which are designated in the template can be identified within the input image. This ability to identify specific objects within the input image which have been previously been designated within a template is quite useful in a number of applications, including robotic control and other machine vision applications, automated inspection systems, automated surveillance systems and medical imagery applications.

A number of image correlation and image detection methods have been developed to identify previously designated objects within an input image. These conventional image detection and correlation systems still suffer from several deficiencies. For example, many conventional image detection methods require significant amount of data processing and computation in order to effectively compare the input image with the template or reference image. Thus, image detection systems based upon these conventional detection methods may require a significant amount of time in order to compare the input image with the template and to identify the designated object within in the input image.

SUMMARY OF THE INVENTION

Therefore, it is an object of the present invention to provide an image processing apparatus and method for detecting pattern matching between an input image and a reference image (template) within a short period of time.

It is another object of the present invention to provide an image processing apparatus which performs a pattern matching procedure between an input image and a template image after compressing the input and template images.

It is a further object of the present invention to provide an image pattern matching method which includes a plurality of pattern matching modes having different degree of compression ratio and supplemental pattern matching modes.

It is a further object of the present invention to provide an image pattern matching apparatus incorporating parallel processing techniques such as vector processing memory banldng and multiple parallel functional units to achieve high speed performance.

In the present invention, an image processing apparatus for detecting pattern matching between an input image and a template image includes a first memory for storing a reference pattern as a template, a second memory for storing an input image for which pattern matching with the template is to be detected, means for compressing the template from the first memory and the input image from the second memory by a predetermined compression ratio, a compressed data memory for storing the compressed input image and the compressed template from the compressing means, a main processor for computing inter-correlation between the compressed input image and the compressed template by scaning the compressed input image for each sub-block thereof and determining a location of the compressed input mage showing a best match in a current pattern matching mode. The current pattern matching mode is one of several pattern matching modes with different degrees of compression ratio involved in the compression means and the inter-correlation is determined through two or more pattern matching modes in the order from a higher compression ratio to a lower compression ratio.

Another aspect of the present invention is an image processing method for detecting a pattern match between the input image and the template. The method includes the steps of storing a reference pattern in a first memory as a template, storing an input image for which pattern matching with the template is to be detected in a second memory, compressing the template from the first memory and the input image from the second memory by a predetermined compression ratio, storing the compressed input image and the compressed template from the compressing means in a compressed data memory; and computing inter-correlation between the compressed input image and the compressed template by scanning the compressed input image for each sub-block thereof and determining a location of the compressed input mage showing a best match in a current pattern matching mode. The current pattern matching mode is one of plural pattern matching modes with different degrees of compression ratio involved in the compression means and the inter-correlation is determined through two or more pattern matching modes in the order from higher compression ratio to lower compression ratio.

According to the present invention, the image processing apparatus and method is capable of detecting pattern matching between an input image and a reference image (template) at high speed within a short period of time by incorporating the compression process for the input image and the template before the pattern matching computation. The image processing apparatus performs a pattern matching procedure through a plurality of pattern matching modes with different degree of compression. The pattern matching is performed in the order from the coarse pattern matching mode (higher compression) to the fine pattern matching mode (lower compression and no compression) to decrease an overall time for detecting a best match between the input image and the template. The time required for the compression process is also decreased by incorporating parallel processing techniques such as vector processing memory banking and interleaved memory banking.

BRIEF DESCRIPTION OF THE DRAWINGS

FIG. 2 is a data table showing relationship between modes of pattern matching and degrees of pixel data compression in the present invention.

DETAILED DESCRIPTION OF THE PREFERRED EMBODIMENT

Figure 1:
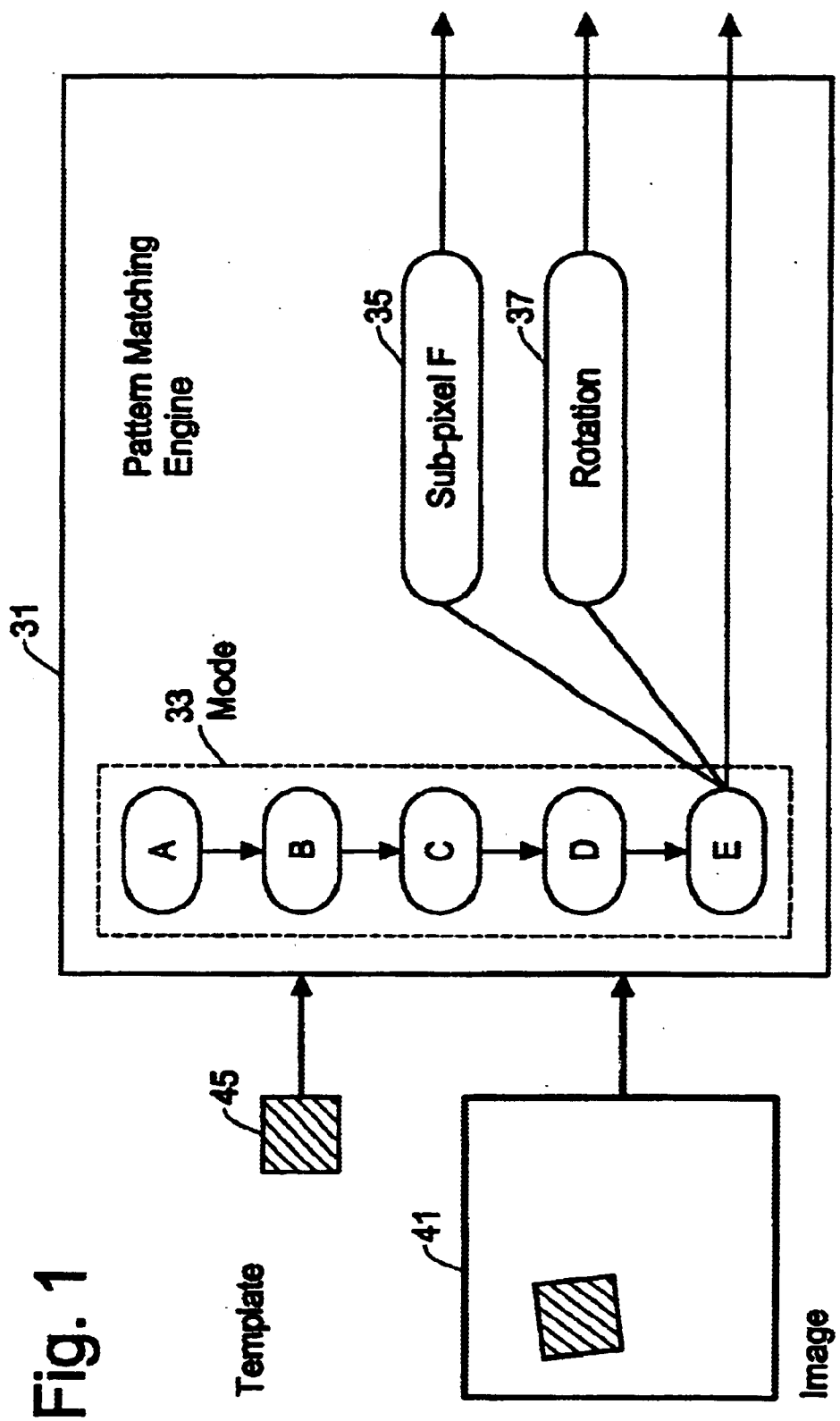
FIG. 1 is a schematic block diagram showing a basic concept of the present invention for carrying out the pattern matching procedure.

The present invention will now be described in more detail hereinafter with reference to the accompanying drawings in which a preferred embodiment of the present invention is shown. FIG. 1 schematically shows a basic concept of the present invention for carrying out the pattern matching procedure. The image processing apparatus of the present invention incorporates unique pattern matching algorithm computations and memory system architectures to achieve performance speedup.

A pattern matching engine 31 includes functions of finding the best match for a reference pattern (template) 45 within a larger input image 41. To speed up the pattern matching process, the algorithm operates first on coarse grain compressed images progressively moving to finer grain images. The search is carried out by comparing the template which is compressed with every possible sub-block of the input image which is also compressed with the same dimensions as the template. The coarse search involves a higher degree of compression which is followed by the fine search involving a lower degree of compression or no compression.

This search continues until the entire image has been scanned and evaluated. Furthermore, the search may involve rotating the template to achieve a better match, if desired. At the conclusion of a pattern matching cycle in the mode group 33, the engine will return to the starting point, such as an upper left pixel location of the best match found, for the next level of pattern matching cycle.

In the preferred embodiment of the present invention, the pattern matching algorithm includes five separate pattern matching cycles or scan modes A–E shown in the mode group 33 which operate in a raster (Manhattan) style scanning on the template and input image. In the pattern matching modes A–E, no rotation is involved. The scan mode A represents the highest degree of compression or coarse grain while the mode D is fine grain with the lowest degree of compression. The scan mode E involves no pixel compression.

The pattern matching engine 31 further functions a subpixel mode 35 which is a sub-pixel adjustment for the best match coordinates (x, y) determined by scan modes A–E. Additionally, there is a rotational mode 37 which involves rotating the input image or template in order to obtain a better template match. As will be described later, the rotational mode 37 includes different degrees of rotation. Although not shown specifically in FIG. 1, the pattern matching engine 31 may also function a skip mode in which every other line of the compressed template and compressed image are processed to determine the best match. While this skip mode will reduce the overall memory accesses and time required to perform a match, it does not result in a 50% speedup due to other functions which do not experience due to skip mode.

The similarity among these modes A–E is that they rely on the same basic algorithm and calculations to determine the best match within the input image. The difference among these modes lies, as noted above, in the amount of compression applied to the input image (or its subset) and the template. The data table in FIG. 2 shows different degrees of compression in the raster scan modes A–E as well the sizes of the compressed pixels and numbers of scan iteration involved in each mode.

The highest compression ratio of 256:1 is used in the scan mode A in the example of FIGS. 1 and 2. Thus, supposing the template image is formed with 128×128 pixels and the input image is formed with 512×480 pixels, the compressed template is configured by 8×8 pixels and the compressed input image is configured by 32×30 pixels. The number of scan iteration in this mode is 575. For the best match found by the pattern matching operation in the scan mode A, the pattern matching engine 31 performs the scan mode B with the reduced compression ratio and scan iteration. Namely, for the area of the input image having the 160×160 pixels which contains the location of the best match detected in the scan mode A, the pattern matching in the scam mode B is carried out with the compression ratio 64:1.

In this manner, the pattern matching operations repeat in the scan modes A–E, i.e., from the highest compression rate to the no compression, to detect the best match between the template and the input image. As shown in the table of FIG. 2, no compression is included in the scan mode E so that 128×128 pixels of the template and the 130×130 of the detected location of the input image are compared with each other. As shown in FIG. 1, the pattern matching procedure ends after detecting the best match in the scan mode E.

Alternatively, supplemental pattern matching modes such as the sub-pixel mode 35 and/or the rotation mode 37 may also be conducted.

As noted above, the original (uncompressed) template has 128×128 pixels, and the original input image has 512×480 pixels, both of which are used in the scan mode A after being compressed. While the full template is always used for each mode, successive images for the modes B–D are pixel subsets taken from the best match from the predecessor mode. The compression algorithm used by the pattern matching is a pixel averaging method which is well known in the art.

Figure 3A:
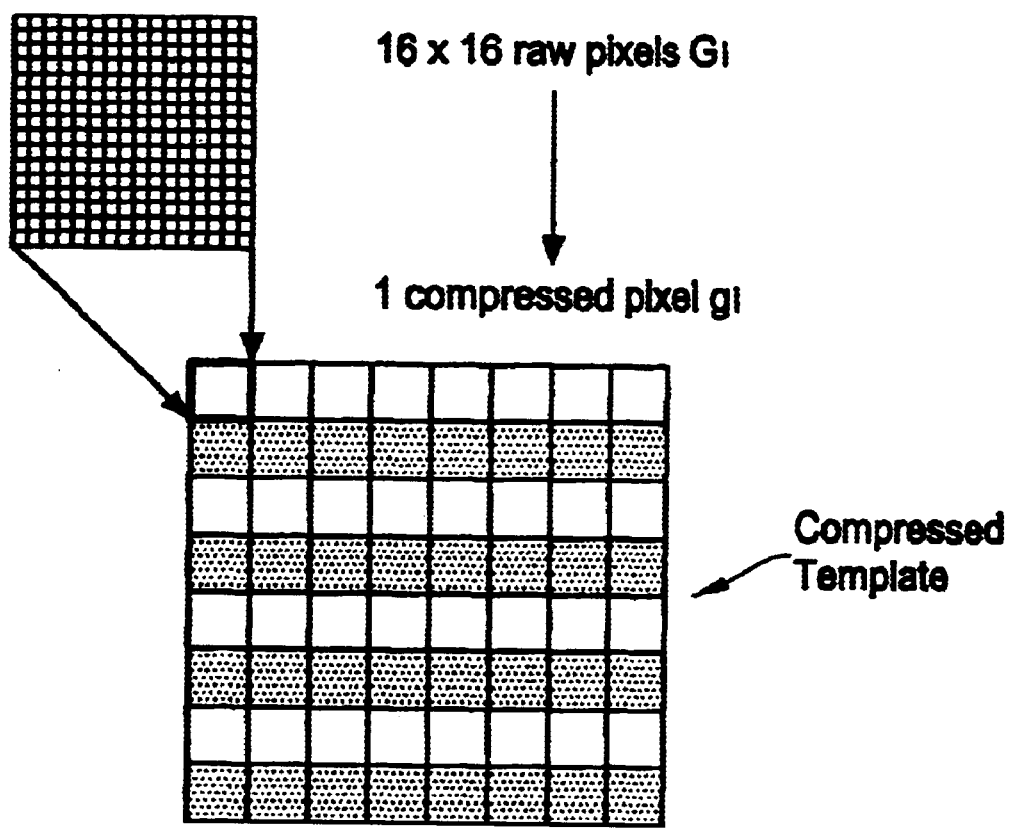
FIG. 3A is a schematic diagram showing the compression of template pattern in the mode A of FIG. 2 where 128×128 pixels are reduced to 8×8 pixels.
Figure 3B:
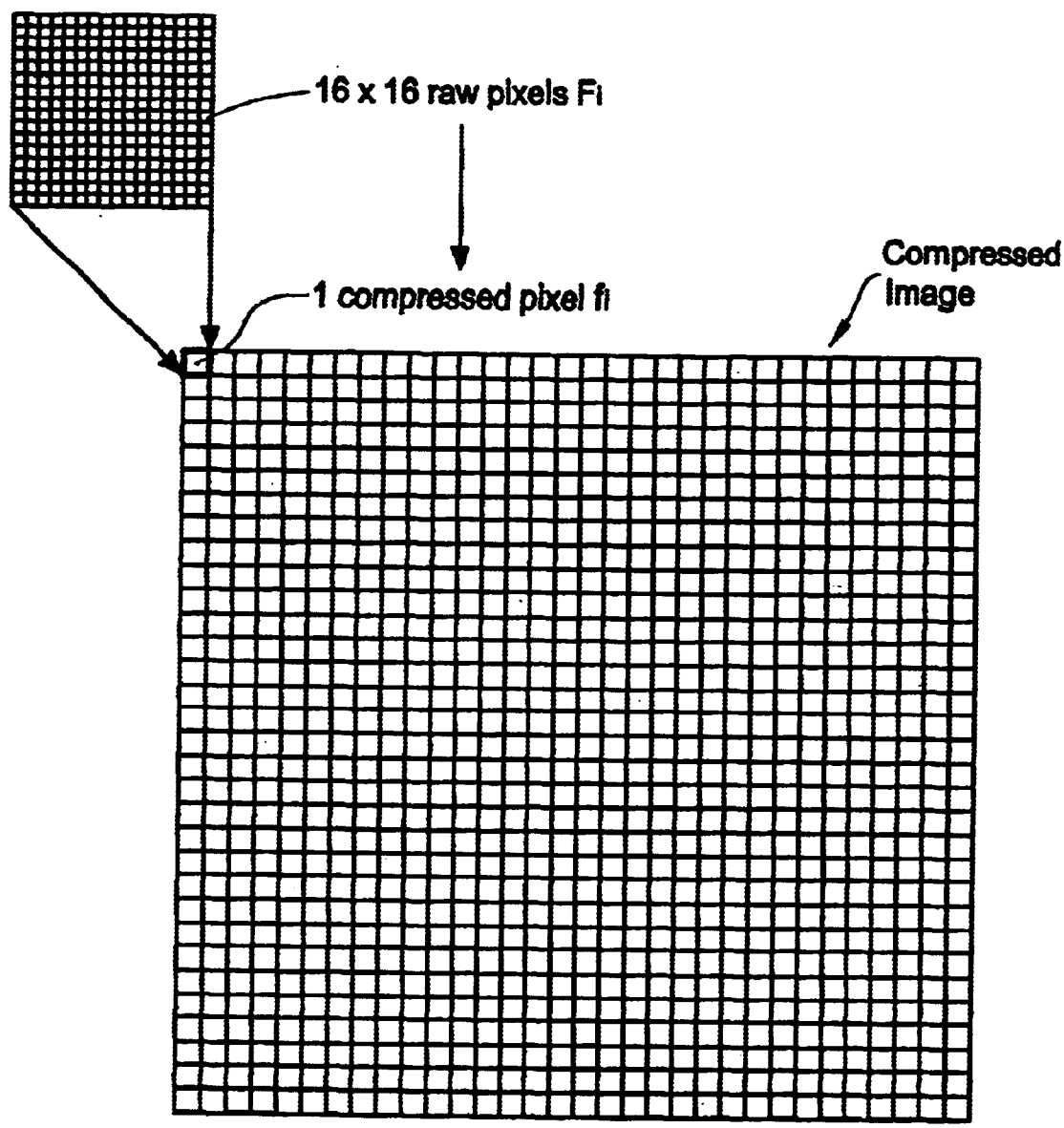
FIG. 3B is a schematic diagram showing the compression of input image pattern in the mode A of FIG. 2 where 512×480 pixels are reduced to 32×30 pixels.

FIG. 3A shows the compression of the template in the scan mode A in which the reduction of the 128×128 pixels down to 8×8 is achieved by pixel averaging over a 16×16 block. In the skip mode noted above, the shaded rows of pixels in FIG. 3 will be ignored. Similarly, FIG. 3B shows the compression of the input image in the scan mode A in which the reduction of the 512×480 pixels down to 32×30 is achieved by the pixel averaging over a 16×16 block. In the skip mode, every other row of pixels is not used in the pattern matching calculation.

The template calculation under this situation is considered here. Let Gi denote a single uncompressed template pixel, then, the compressed pixel gi is computed as:

$$gi = \frac{\sum_{i+1}^{16 \times 16} Gi}{16 \times 16}$$

Thus, in the scam mode A, the compressed template is composed of an 8×8 matrix consisting of gi. One additional calculation required on the template is computing the template summation "sum" and template self-correlation "rem_tmp" as follows:

$$sum = \sum_{i=1}^{8 \times 8} gi$$

$$rem\_tmp = \sum_{i=1}^{8 \times 8} gi^2 - \left[\sum_{i=1}^{8 \times 8} gi\right]^2 = \sum_{i=1}^{8 \times 8} gi^2 - sum^2$$

This completes the calculations for the template. The upper limit of summation in the above equations will be 8×4 for the skip mode. For the uncompressed mode E and the rotation mode, gi and Gi will be identical since the compression ratio is one. All subsequent calculations will remain the same.

Calculations for the input image are similar to those of the template, except that Fi represents an uncompressed pixel in a 512×480 sub-block of the original image. The compressed pixels of the sub-block image fi are computed as:

$$fi = \frac{\sum_{i=1}^{16 \times 16} Fi}{16 \times 16}$$

Similarly, the input image summation "sum" and self-correlation "rem_img" are computed as follows:

$$sum1 = \sum_{i=1}^{8 \times 8} fi^2$$

$$sum2 = \sum_{i=1}^{8 \times 8} fi$$

$$sum3 = \sum_{i=1}^{8 \times 8} (fi \times gi)$$

$$rem\_img = \sum_{i=1}^{8 \times 8} fi^2 - \left[\sum_{i=1}^{8 \times 8} fi\right]^2$$

Thus, the self-correlation "rem_img" is equal to {sum1−(sum)$^2$}. The upper limit of summation in the above equations will be 8×4 for the skip mode. For uncompressed and rotation modes, fi and Fi will be identical since the compression ratio is one. All subsequent calculations will remain the same.

After computing the self-correlation for the template and image sub-block, the pattern matching computes the inter-correlation, rem_tmp_img, between the template and image sub-block as:

$$rem\_tmp\_img = \sum_{i=1}^{8 \times 8} (fi \times gi) - \left[\left(\sum_{i=1}^{8 \times 8} fi\right) \times \left(\sum_{i=1}^{8 \times 8} gi\right)\right]$$

Thus, the inter-correlation "rem_tmp_img" is equal to {sum3−(sum2)(sum)}. The upper limit of summation in the above equations will be 8×4 for the skip mode.

The final algorithm step is computing the regulated (normalized) correlation "corr" between the self-correlation and inter-correlation as:

$$corr = \frac{(rem\_tmp\_img)^2}{(rem\_img)(rem\_tmp)}$$

The "corr" value is the metric for measuring the accuracy of the pattern match between the template and image sub-block. The closer the correlation value is to 1.0, the better the match for that image sub-block.

Figure 4:
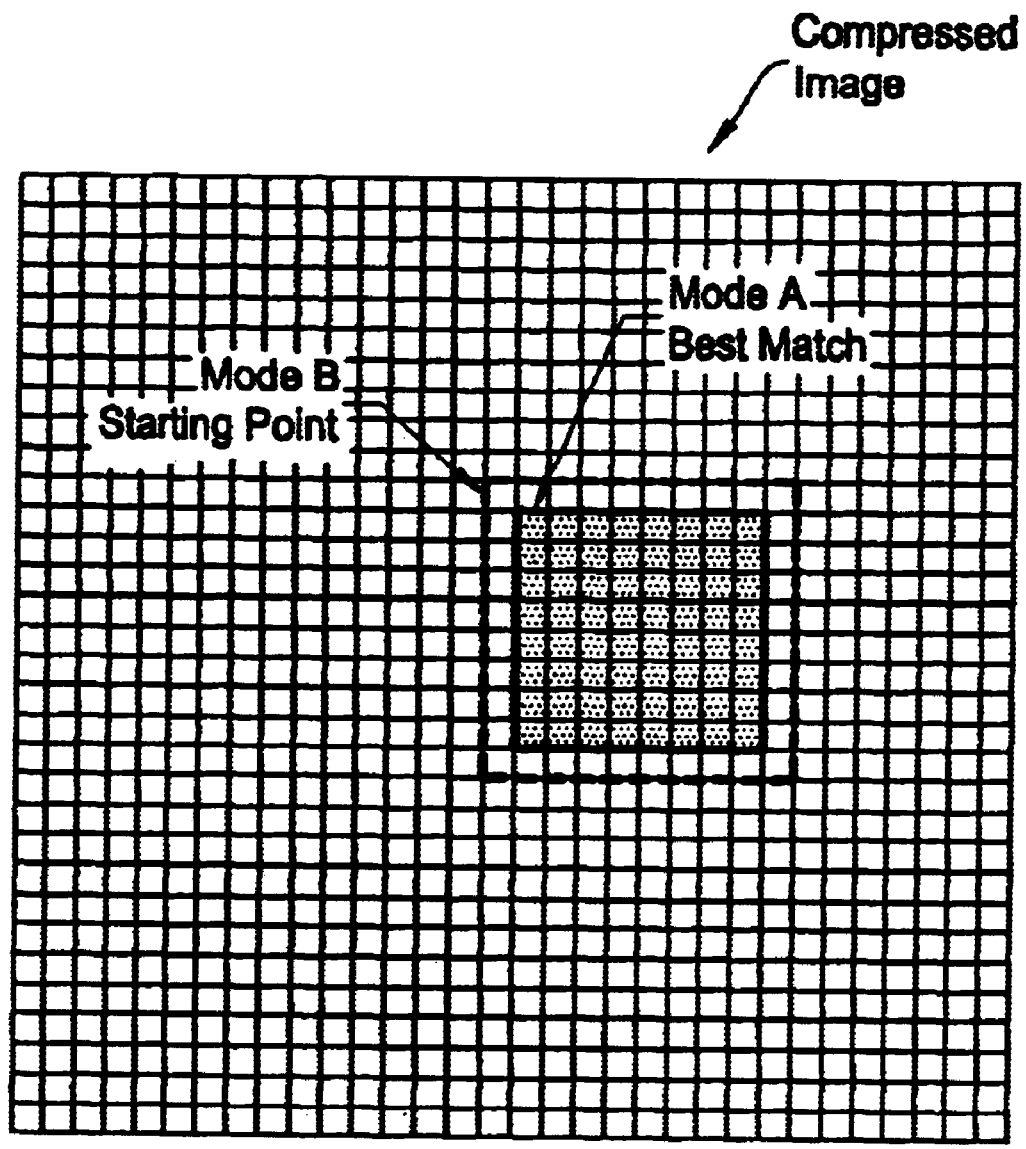
FIG. 4 is a schematic diagram showing a relationship between the mode A and the mode B in the pattern matching procedure of the present invention where the mode B is carried out for the area of pixels which shows the best match in the mode A.

After determining the best match location in the current mode, the pattern matching algorithm moves to a finer grain matching mode. For example, the scan mode A determines the best pattern match of an 8×8 compressed pixel block (or 128×128 raw pixels) of the template. The start point for the scan mode B is offset by one compressed pixel (or 16 raw pixels) in each direction around the mode A best match, leading to a 160×160 (=16+128+16) sub-image for the scan mode B. This situation is shown in FIG. 4 wherein the area for the mode B pattern matching is offset by one compressed pixel of the input image over the shaded location showing the mode A best match.

Figure 5A:
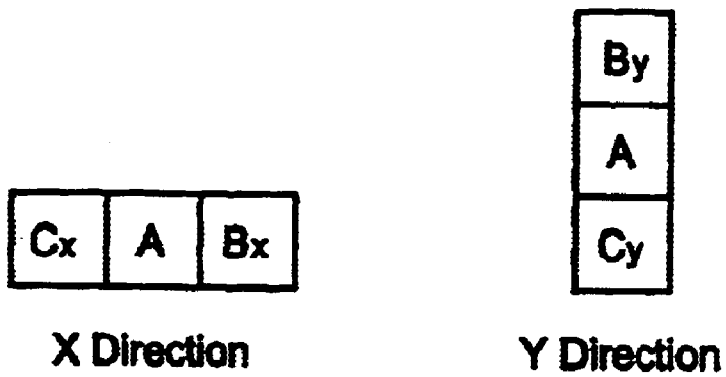
FIGS. 5A and 5B are schematic diagrams showing an example of sub-pixel mode in the pattern matching procedure of the present invention.
Figure 5B:
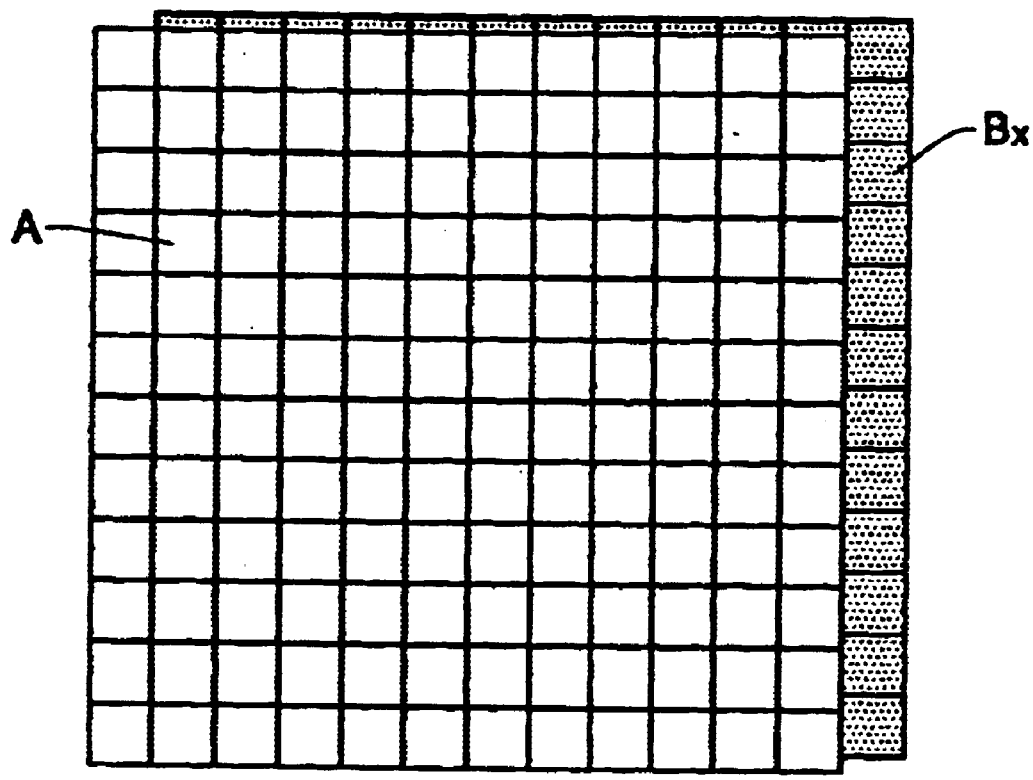

In addition to the scan modes A–E, the sub-pixel mode 35 (FIG. 1) may be performed which is a sub-pixel adjustment to the best pattern match location. One of the advantages of the sub-pixel mode is to attain higher resolution and accuracy than what is available from the camera definition. Given pixel A as the best match from the uncompressed mode E with B and C as its neighbor pixels shown in FIGS. 5A and 5B, the sub-pixel mode adjustments Fx and Fy are made by examining the inter-correlation for the sub-pixels. Namely, the best match area having 128×128 pixels is shifted by one pixel in right (Bx) and left (Cx) and up (By) and down (Cy), i.e., the pattern matching computation is made four (4) times (iterations).

$$Fx = \frac{A \times (Bx - Cx)}{2 \times (Bx \times A) + (A \times Cx) - (2 \times Bx \times Cx)}$$

$$Fy = \frac{A \times (By - Cy)}{2 \times (By \times A) + (A \times Cy) - (2 \times By \times Cy)}$$

Where A, Bx, Cx, By and Cy denote the uncompressed mode inter-correlation values of pixel block with its upper left corner at pixel location A, Bx, Cx, By and Cy as calculated by the foregoing calculation formula. If the correlation values from the scan mode E can be saved for the sub-pixel mode use, then only two (2) iterations on the uncompressed pixels are required to compute the sub-pixel adjustments.

Figure 6A:
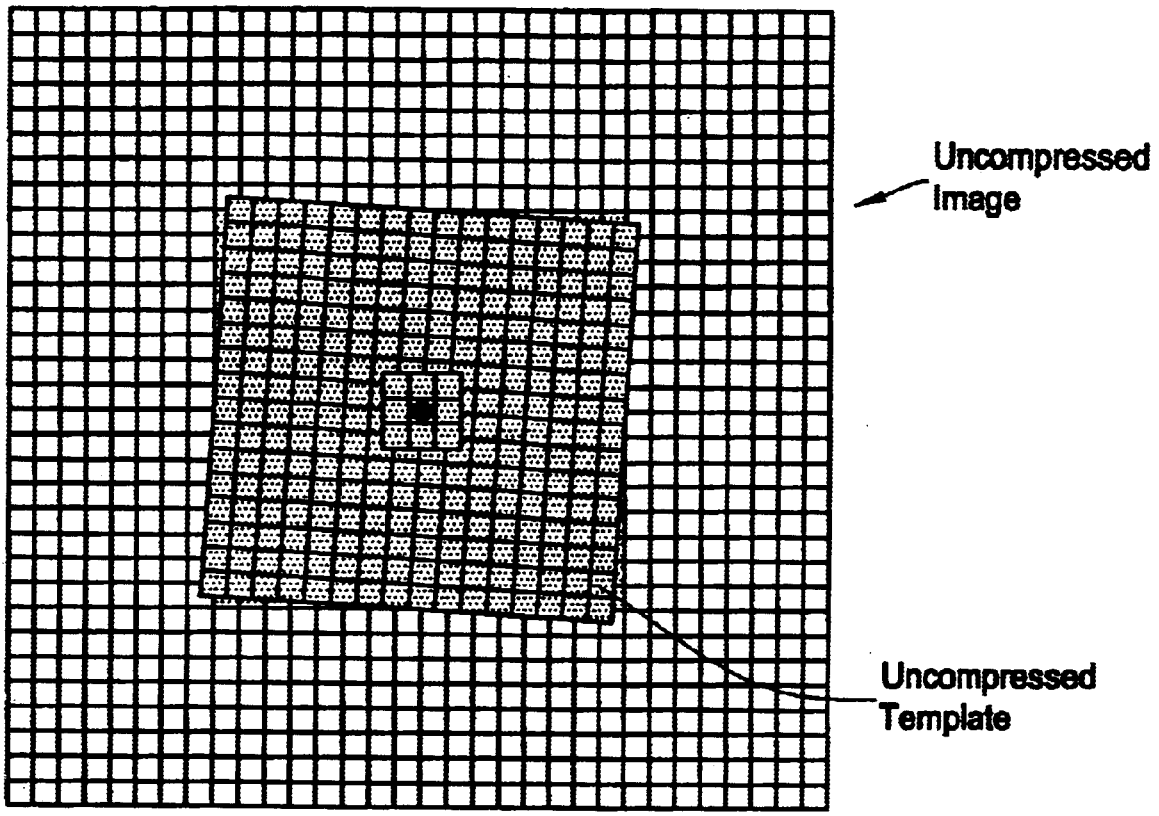
FIGS. 6A and 6B are schematic diagrams showing an example of rotation of the template or input image in the rotation mode incorporated in the pattern matching procedure of the present invention.
Figure 6B:
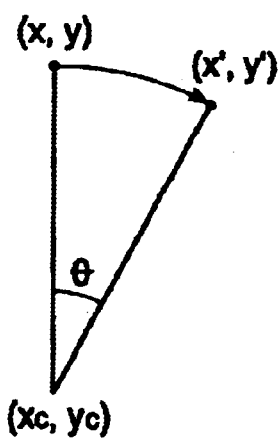

An example of rotation mode is shown in FIGS. 6A and 6B. The rotation mode compares the template to a block of input image pixels transformed using a standard rotation of axes around a center point. The angle of rotation is varied through a binary search algorithm to determine the best angle of rotation within pre-determined bounds. Furthermore, multiple center points of rotation are examined around the best match point from the uncompressed scan mode E. All rotation pattern matching is on the uncompressed template and image. The rotation mode pattern matching involves a rotation transformation of the input image pixel coordinates according to the affine conversion equations below.

$$x' = \{(x-x_c) \times \cos\theta\} - \{(y-y_c) \times \sin\theta\} + X_c$$

$$y' = \{(x-x_c) \times \sin\theta\} - \{(y-y_c) \times \cos\theta\} + Y_c$$

where x, y, $x_c$, $y_c$, and $\theta$ are shown in FIG. 6B.

The pattern matching process applies the same correlation criteria as that of uncompressed pattern matching mode E described in the foregoing. The range for the angle of rotation is from −32° to +32°. A binary search iteration is used to determine the best angle using increments of, for example, ±8°, ±4°, ±2°, ±1°. In addition to the angle of rotation iterations, rotation mode pattern matching also varies the center point of rotation (origin) around the 3×3 block of neighbor pixels from the best scan mode E match as shown in FIG. 6A. This increases the number of iterations from 18 to 162 for the rotation mode pattern matching.

Figure 7:
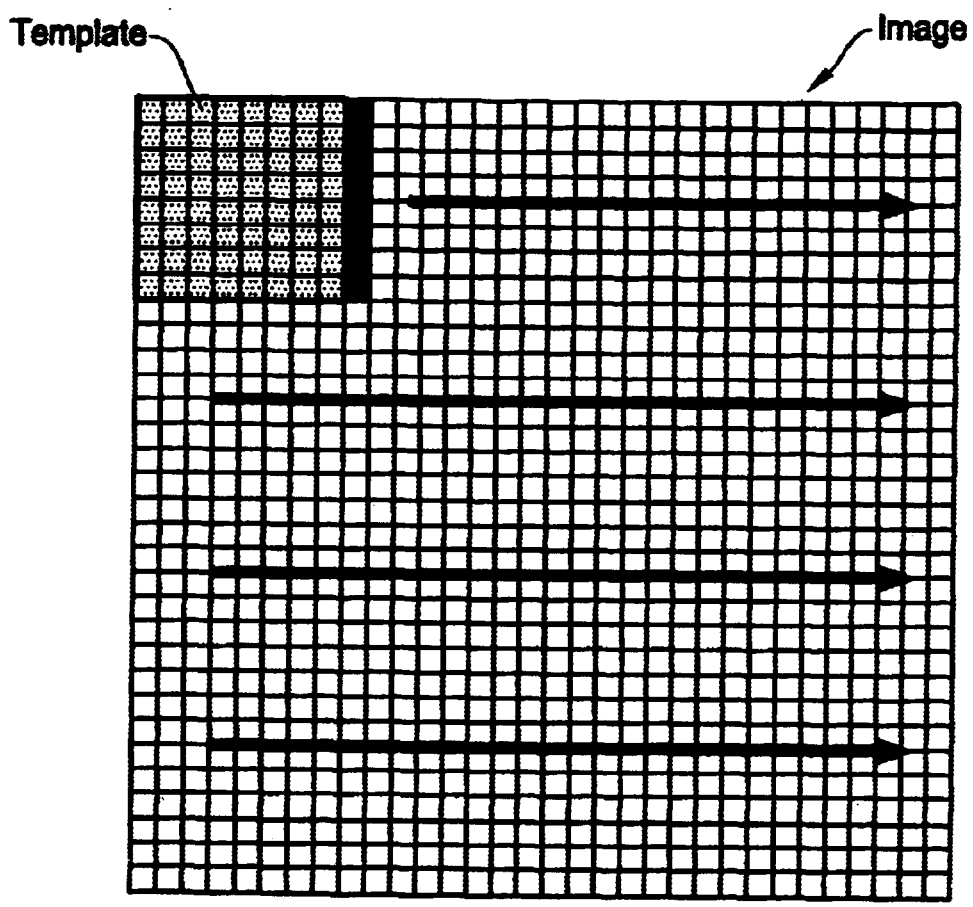
FIG. 7 is a schematic diagram showing an example of scanning the image pattern by the template pattern in a sequential manner.

Several pattern matching engine designs were investigated. One straightforward solution to the pattern matching problem is to basically sequentially scan the image frame-by-frame performing the required compression and calculations on-the-fly. In FIG. 7, assuming pixel 0, corresponding to the upper left-hand corner, is stored in memory location 0, overlapping frames of 128×128 image pixels can be read from memory and processed to determine the matching correlation between the template and that particular frame of the input image.

To complete an entire scan of the image for the raw data of the input image and the template, an extremely large number of memory accesses will be required in this basic sequential approach to conduct the pattern matching. As mentioned earlier, the basic sequential scan method is the most straightforward implementation. It can be implemented as an on-the-fly solution without requiring any additional memory elements.

Figure 8:
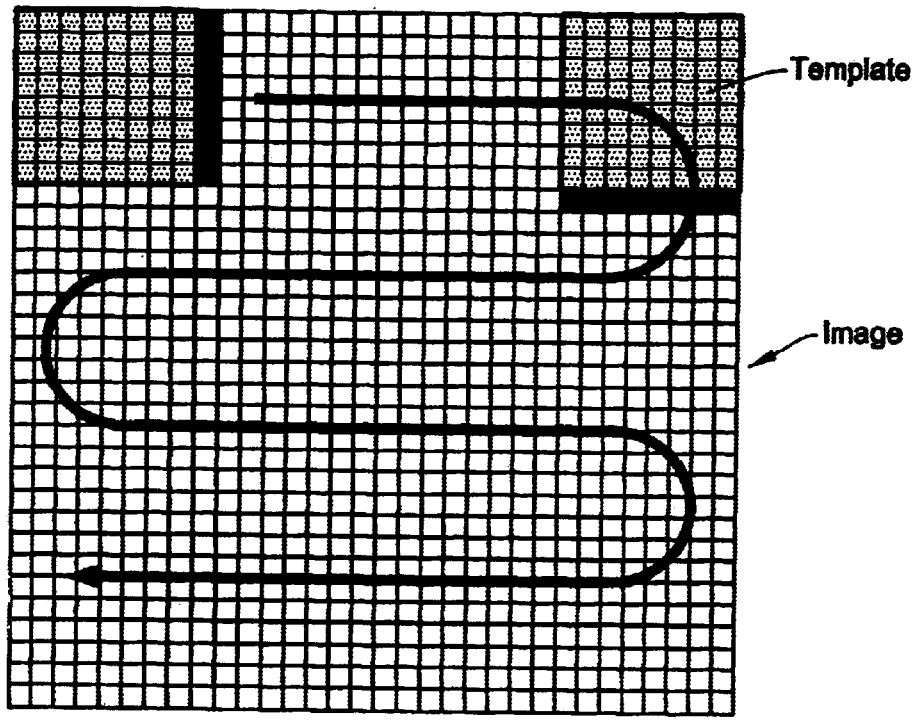
FIG. 8 is a schematic diagram showing an example of scanning the image pattern by the template pattern in a snake like manner.

A modification to the basic sequential scan approach described in the above would be a snake like scanning approach as shown in FIG. 8. By combining this snake scan approach with a small amount of memory to current sub-block frame for functioning as a cache, only the minimal one row of new raw image pixels needs to be accessed from the image memory for each pattern matching iteration. Thus, a substantial amount of reduction in the memory accesses is achieved in the snake scan.

However, in either the sequential scan or snake scan, a large amount of memory accesses is still required when pattern matching is performed on the raw pixel data. Therefore, as noted above, the image processing apparatus of the present invention incorporates image compression pre-processing. In the image compression pre-processing, the pattern matching engine performs image pre-processing by compressing the entire image (input and template) before scanning the input image for pattern matching and store the compressed entire image in its compressed form in a secondary memory. Then, scanning and pattern matching calculations need only operate on the compressed pixels. This compression pre-processing approach can be combined with either basic sequential scan or snake scan.

An additional memory element (on- or off-chip) to store the compressed image is required in the compression pre-processing approach for each of the compressed input image and the compressed template. Such memory requirements are the same in terms of memory size as the data shown in the compressed template and compressed image columns of FIG. 2. The scan mode D requires the largest memory for both the image and template, which is still small enough in actual applications.

As determined through software execution profiling of the behavioral models, memory access time will be the dominate factor in pattern matching performance. To reduce the overall memory access time, the present invention further incorporates memory banking technology. The memory banking technology allows for the use of shared address lines to reduce I/O needs. For example, for the pattern matching mode A, the most memory intensive mode, 16 memory banks will allow a complete line of an image sub-block frame to be processed in parallel.

Figure 9:
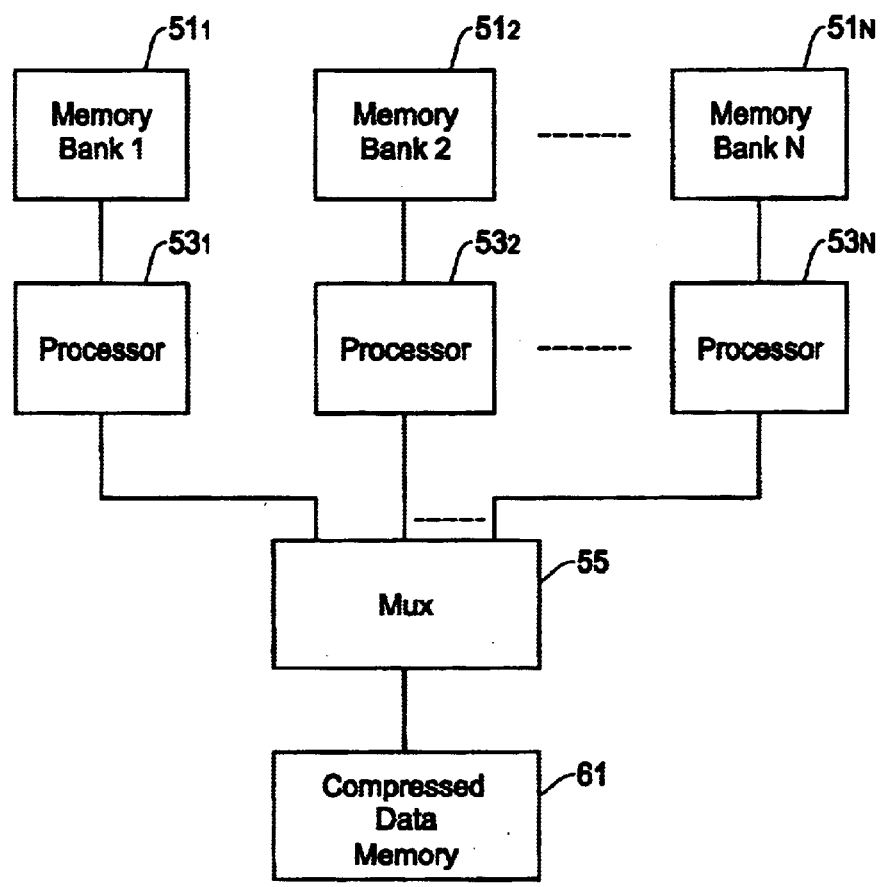
FIG. 9 is a schematic block diagram showing an example of memory structure for compressing the image or template pattern where a plurality of memory banks are accessed in parallel for processing the pixel data by a plurality of processors in parallel.
Figure 10:
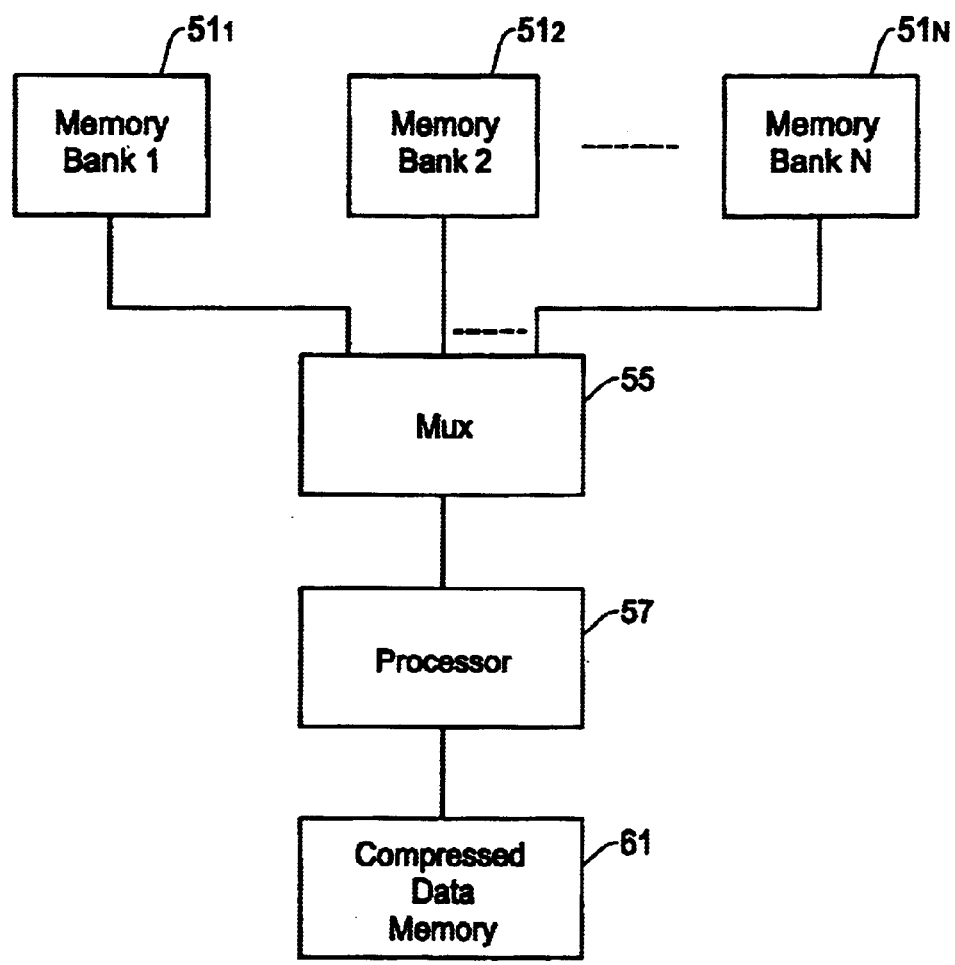
FIG. 10 is a schematic block diagram showing an example of memory structure for compressing the image or template pattern where a plurality of memory banks are accessed alternately for processing the pixel data in an interleave fashion.

FIGS. 9 and 10 show examples of structure involved in the memory banking that can be used in the present invention. FIG. 9 schematically shows a vector processor memory architecture and FIG. 10 schematically shows a memory interleave architecture. Although the examples of FIGS. 9 and 10 show the case where the raw pixel data is compressed and stored in the smaller memory, the pattern matching performance can also be increased with use of the similar parallel methods.

Vector machines in FIG. 9 process multiple word data streams simultaneously typically utilizing highly parallel architectures which require high memory bandwidth. The example of FIG. 9 includes memory banks $51_1$, $51_2$, ... $51_N$, processors $53_1$, $53_2$, ... $53_N$, a multiplexer 55, and a compressed data memory 61. The compression process such as pixel averaging is performed in a parallel fashion by each pair of the memory bank and the processor. The multiplexer 55 selects the compressed data from the processors 53 to be stored in the compressed data memory 61.

The example of FIG. 10 includes memory banks $51_1$, $51_2$, ... $51_N$, a multiplexer 55, a processor 57, and a compressed data memory 61. The compression process such as pixel averaging is performed in an interleave fashion by selectively providing the pixel data from the selected memory bank 51 to the processor 57 through the multiplexer 55. The processor 57 provides the compressed data to the memory 61 to be stored therein. Such interleaved architectures can take advantage of the memory latency accessing each memory bank by accessing all banks in parallel and delivering each bank's contents sequentially (alternately) to the processor.

Within the compression pre-processmg algorithm for pattern matching engine, in the preferred embodiment of the present invention, the vector processor with two memory banks was selected for the access intensive uncompressed image memory. Since the compressed image has far fewer memory accesses, a standard single ported memory can be used for this purpose. The data stored in the two memory banks can alternate between the two memory banks or can be duplicated in both memory banks. Pattern matching performance will not be altered with either choice.

Figure 11:
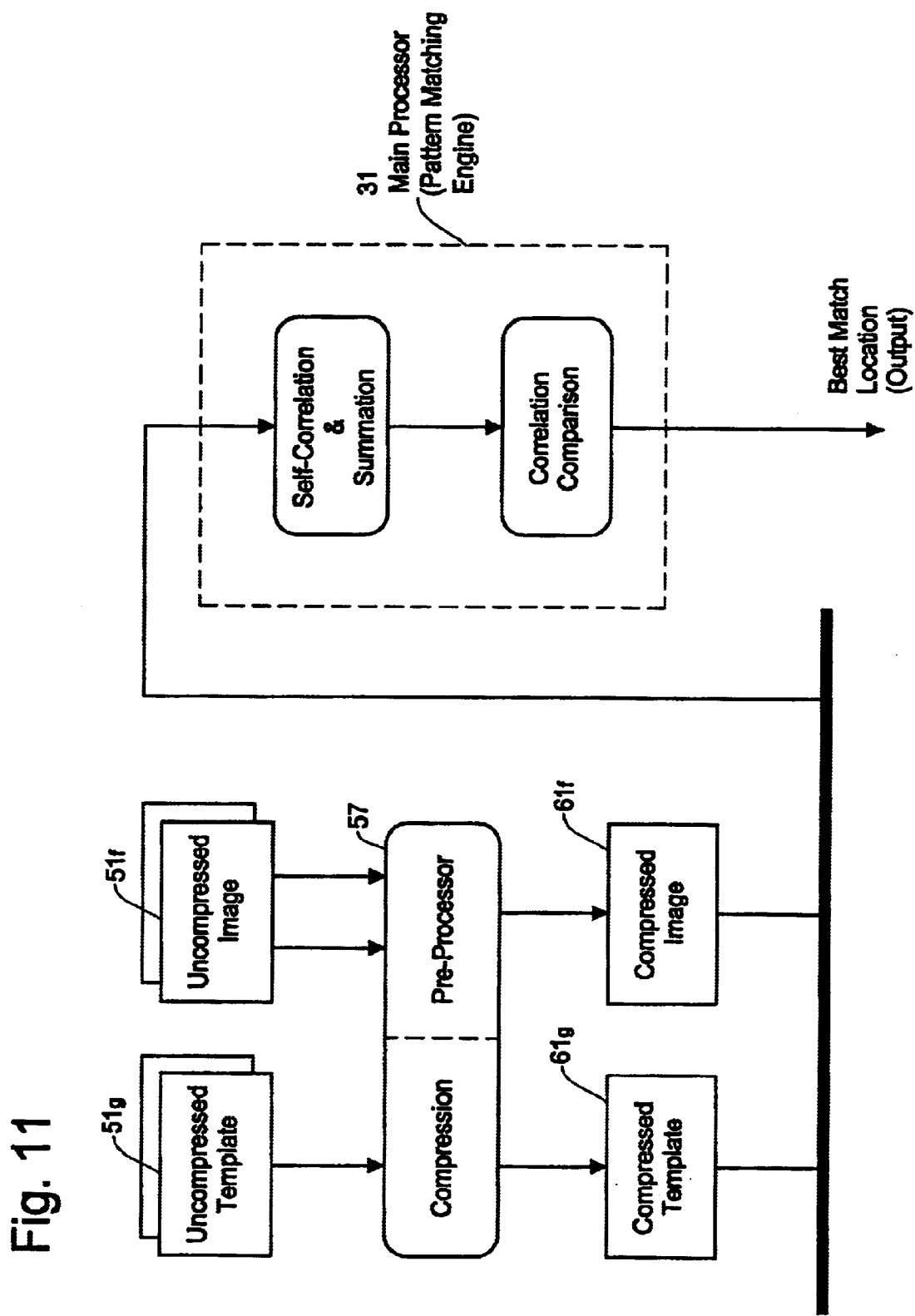
FIG. 11 is a schematic block diagram showing a basic structure of the image processing apparatus of the present invention which includes compression processes for the image and template patterns prior to the pattern matching.

The block diagram of FIG. 11 shows a basic system architecture of the image processing apparatus of the present invention to implement the pattern matching algorithm using the image compression pre-processing approach. The left-hand side shows the pre-processing steps while the right-hand side performs the actual pattern matching calculations. The correlation computation unit basically performs scanning of the image. The correlation comparison performs scanning of the image and determines if the current match is better or worse than the previous best match. The template and image memory sub-system architecture can be selected from one of the memory banking techniques described previously to achieve high performance parallel data access.

In the example of FIG. 11, the image processing apparatus includes an uncompressed template memory 51g, an uncompressed input image memory 51f, a pre-processor 57, a compressed template memory 61g, a compressed input image memory 61f, and a main processor 31. Each of the uncompressed memories 51g and 51f may be configured by two or more memory banks as noted above for reducing the overall memory access time. The pre-processor 57 performs pixel data compression which is, for example, based on the pixel averaging method which is well known in the art.

The main processor 31 performs the self-correlation "rem" and summation "sum" for the template and input image sub-block, and the inter-correlation between the template and the input image sub-block. The main processor 31 further performs the correlation comparison to determine if the current match is better or worse than the previous best match and it the current match is better than the previous match, the current match replaces the previous best match as a new best match.

Figure 12A:
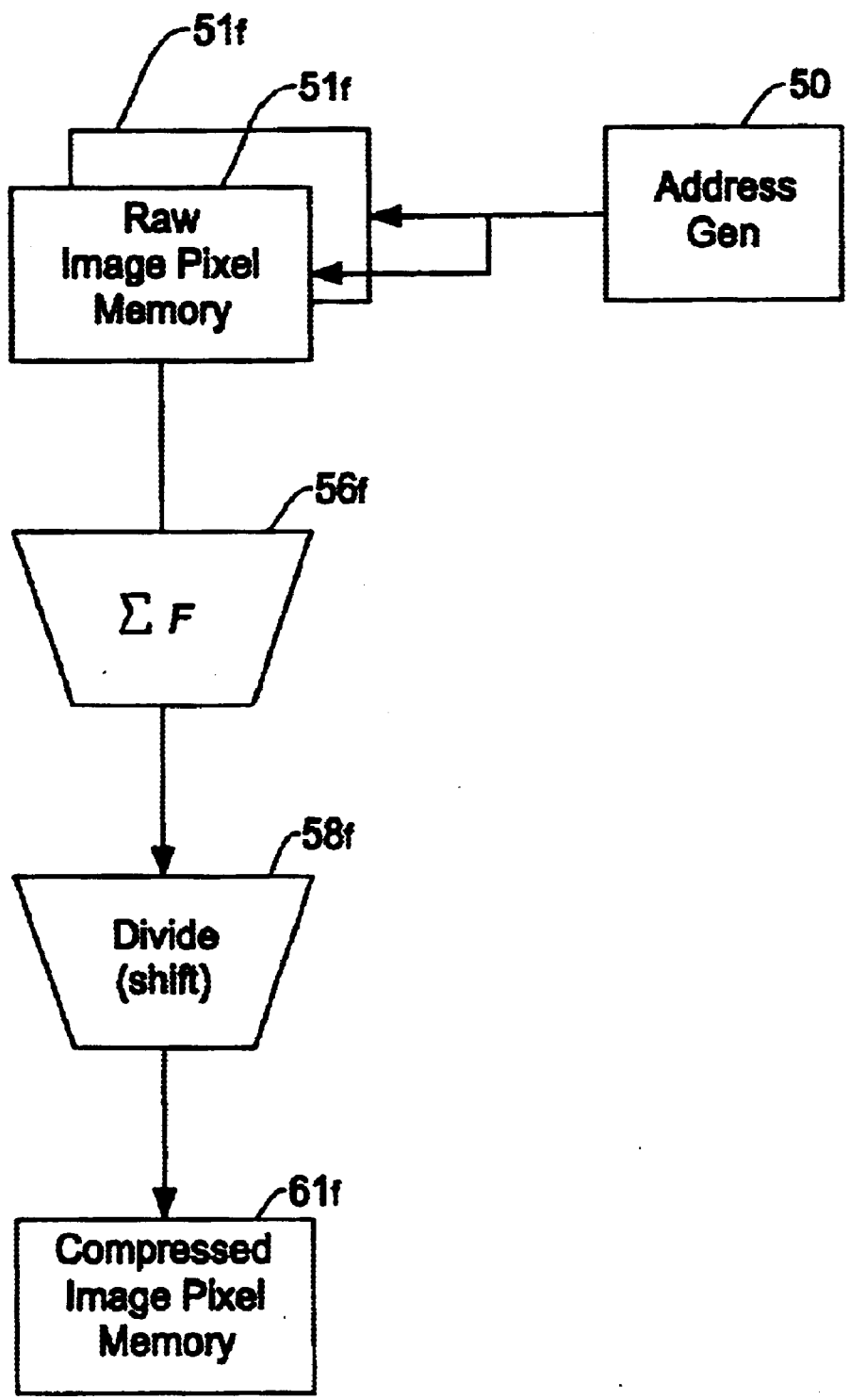
FIGS. 12A and 12B area schematic block diagrams showing an example of structure in the image processing apparatus of the present invention for performing the compression process.
Figure 12B:
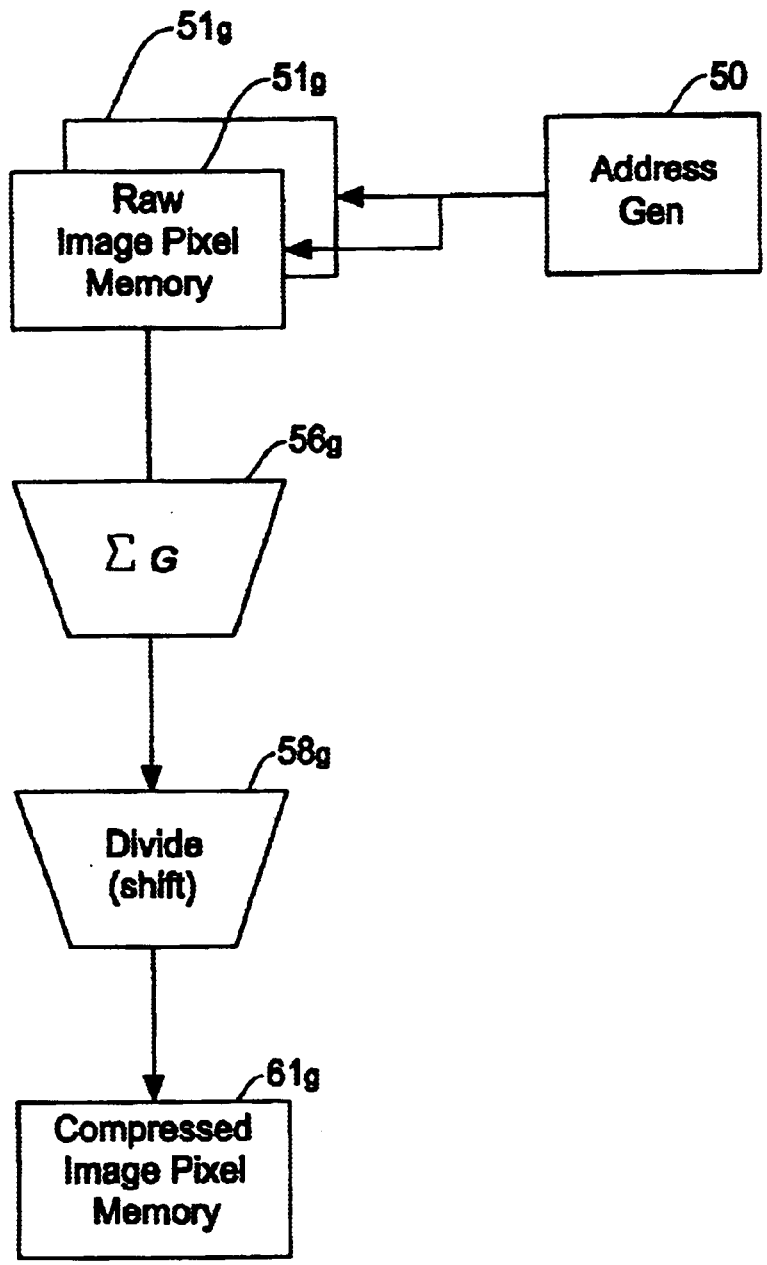
Figure 13:
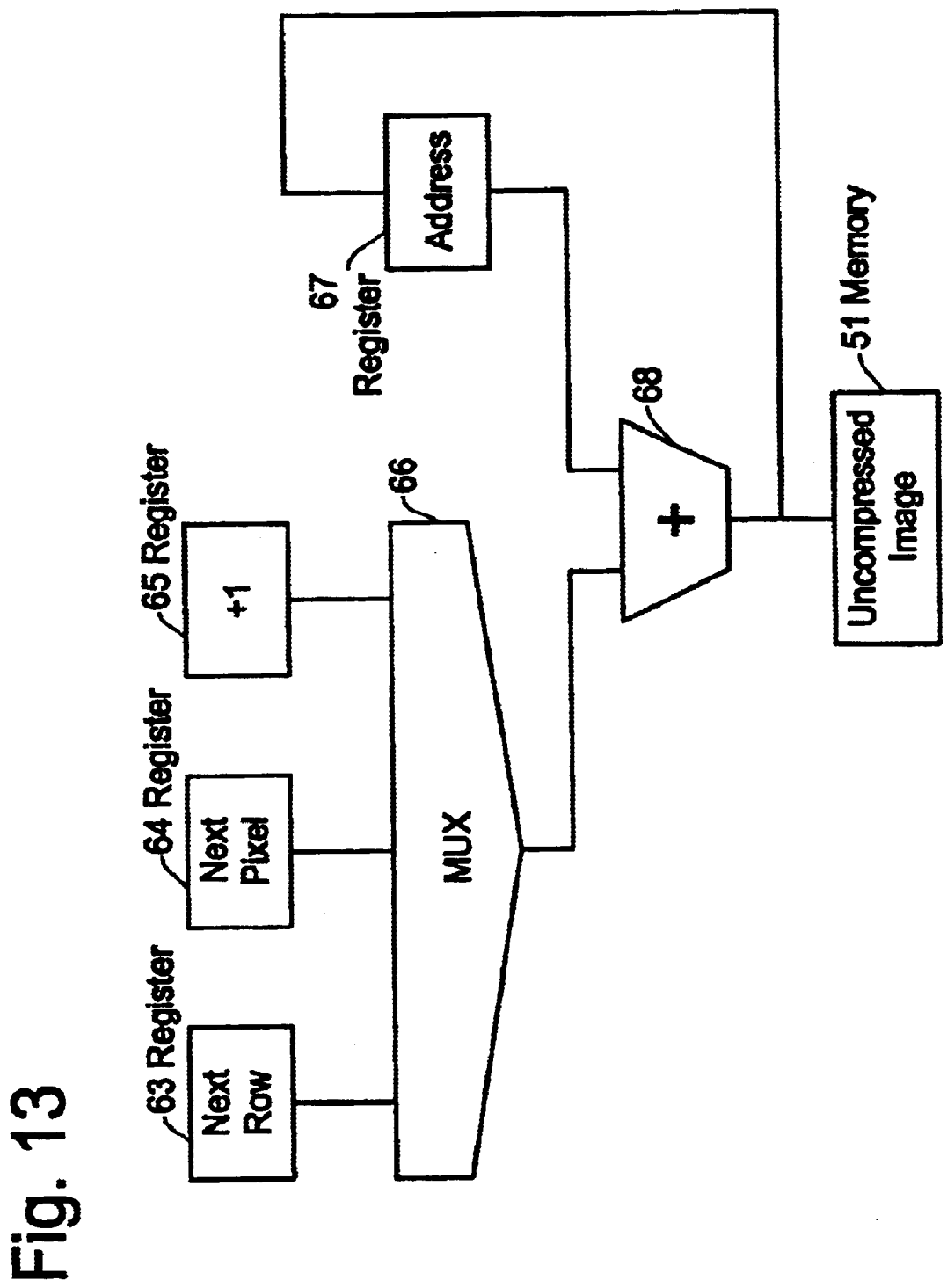
FIG. 13 is a schematic block diagram showing an example of structure for address generation to the uncompressed image memory or template memory in the image processing apparatus of the present invention.

FIGS. 12A and 12B and FIG. 13 show an example of functional blocks involved in the pre-processing that performs the image compression for the pattern matching of the present invention. In FIG. 12A, the pre-processor for the input image consists of an address generation unit 50 for the read access to the uncompressed pixel memory banks 51f and the write access to the compressed pixel memory 61f In addition, the pre-processor performs the pixel averaging function specified by the compression ratio defined in the pattern matching algorithm (mode). The pixel averaging function includes a summation function 56f and a division (shift) function 58f as shown in FIG. 12A as will be described in more detail later. FIG. 12B shows basically the same structure as that of FIG. 12A corresponding to the structure of the pre-processor for the template.

FIG. 13 shows the address generation unit 50 in more detail. In this example, the address generator unit 50 includes registers 63–65, a multiplexer 66, a register 67 and an adder 68. The output of the adder 68 provides the address data to the memory 51. The register 63 provides data representing the next row address in the image memory during the compression process. The register 64 provides data representing the next pixel address to be moved at the conclusion of the compression for the current block. The register 65 is to add "1" to the current address so that the address data is incremented by one. The multiplexer 66 selects one of the data from the registers 63–65. The adder 68 adds the current address data from the register 67 to the data from the multiplexer 66.

Figure 14:
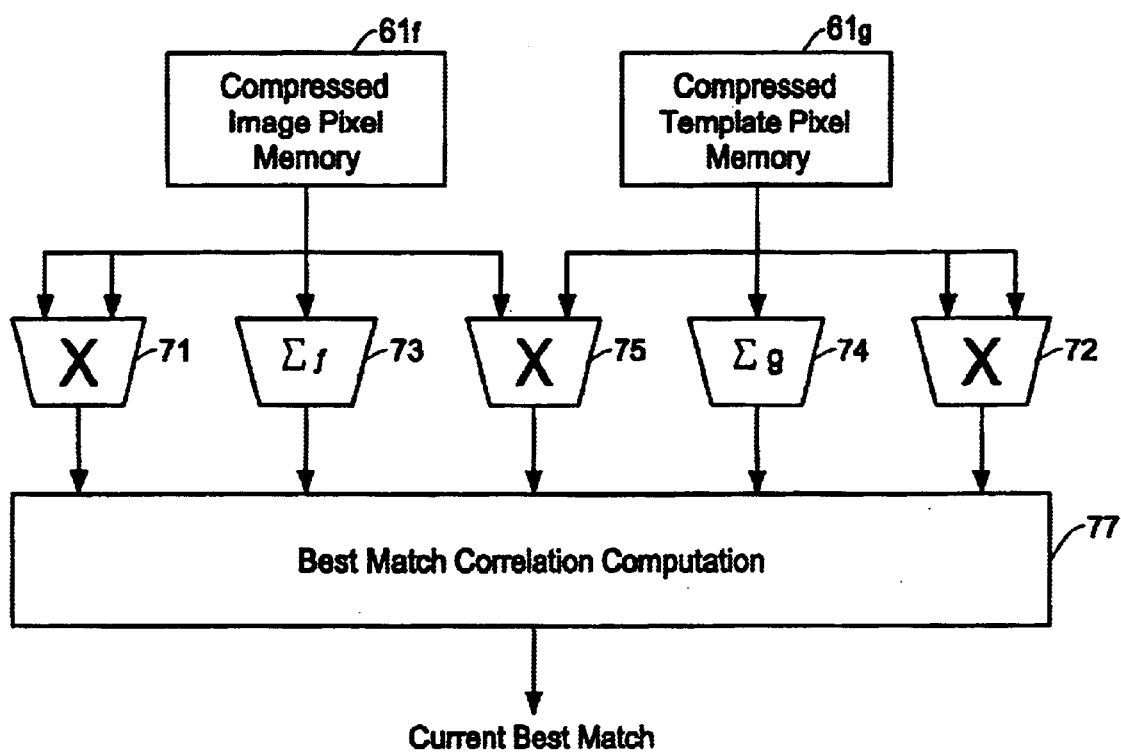
FIG. 14 is a schematic block diagram showing an example of structure for conducting self-correlation, summation, and inter-correlation computation in the image processing apparatus of the present invention.

FIG. 14 shows an example of functional blocks involved in the main processor 31 that performs the pattern matching algorithm of the present invention. The main processor 31 computes the correlation values for each potential pattern match and determines if it is better than the preexisting best match. The number of cycles required for this calculation is dependent on which one of pattern matching modes A–E is being executed.

Figure 15:
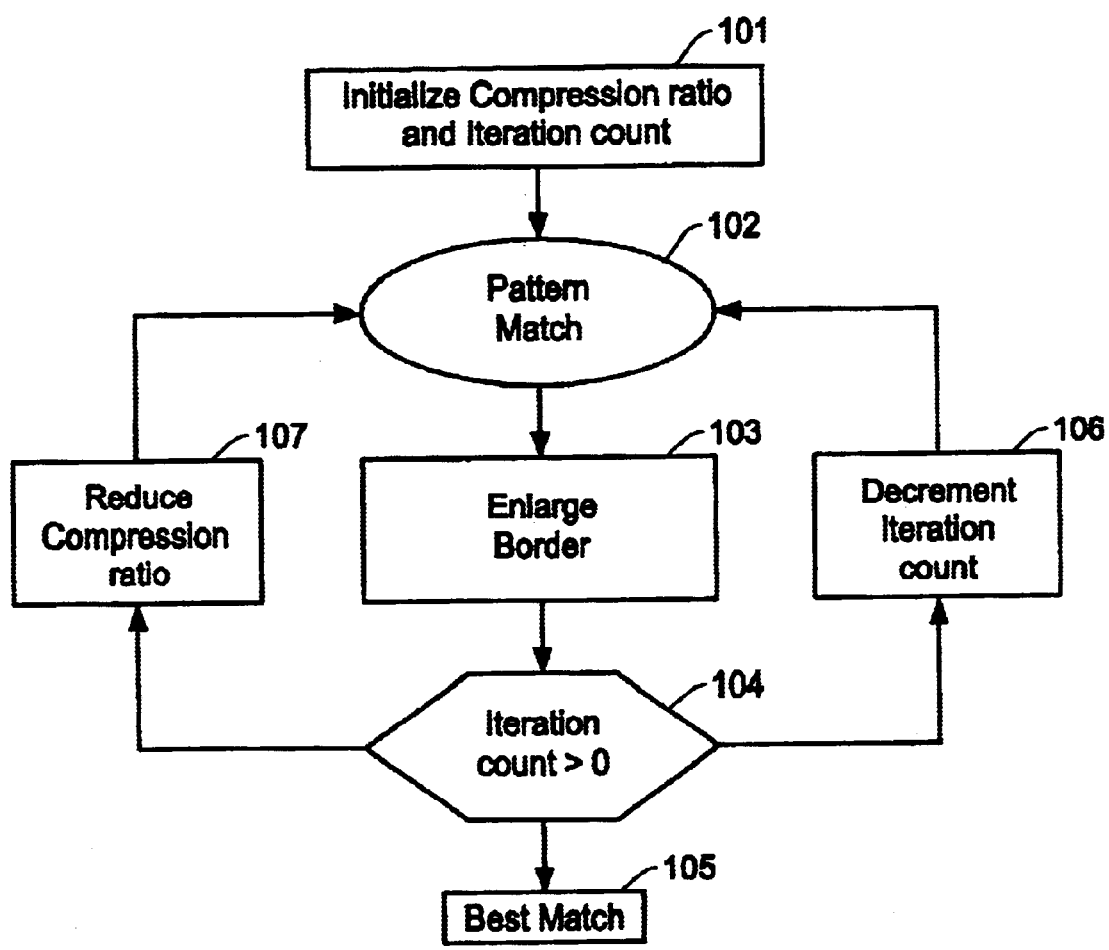
FIG. 15 is a flow chart showing an example of pattern matching sequence in the scan modes A–E shown in FIG. 1 of the present invention.
Figure 16:
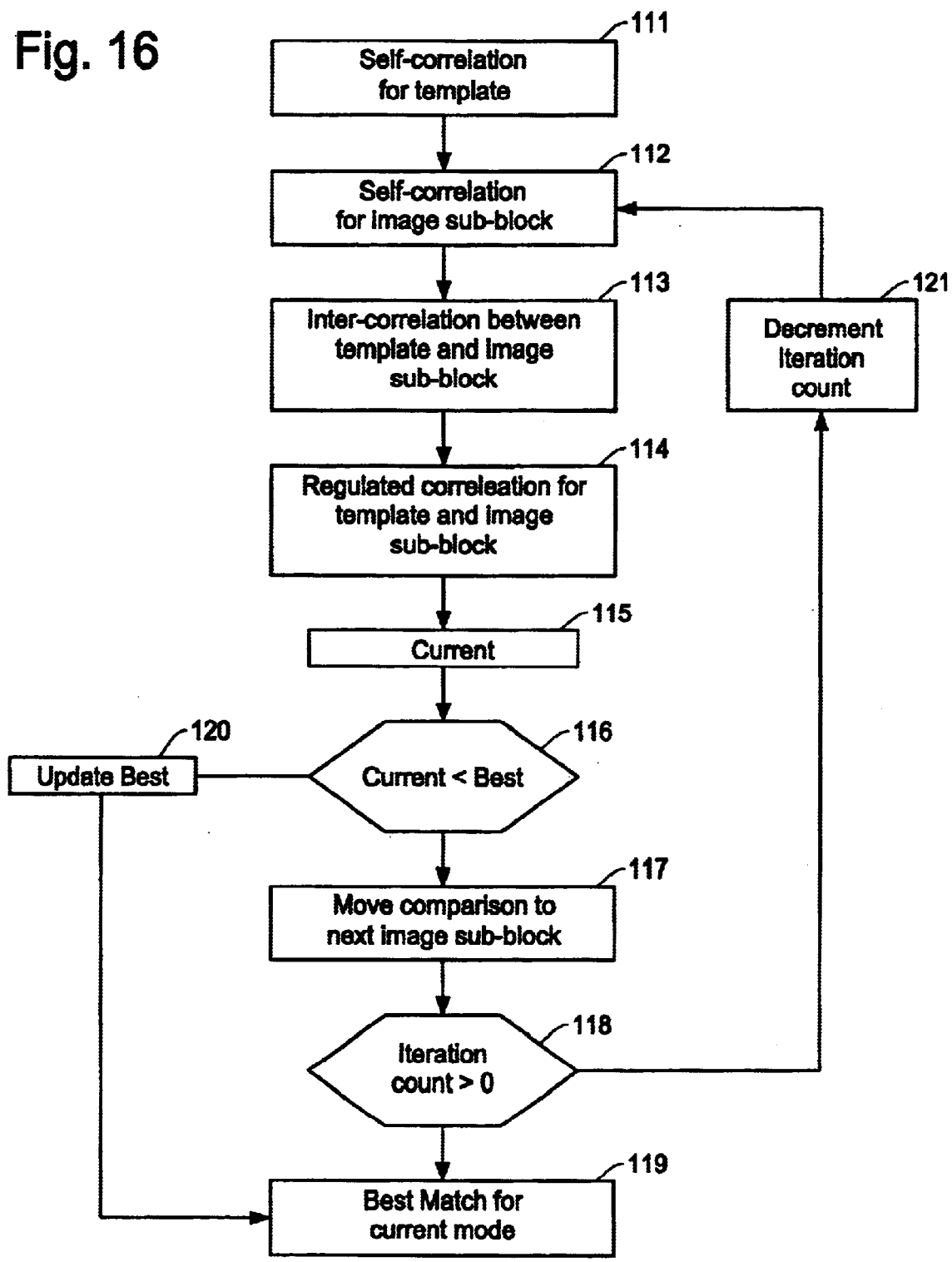
FIG. 16 is a flow chart showing an example of pattern matching sequence including hierarchical expansion of the best match in the present invention.
Figure 17:
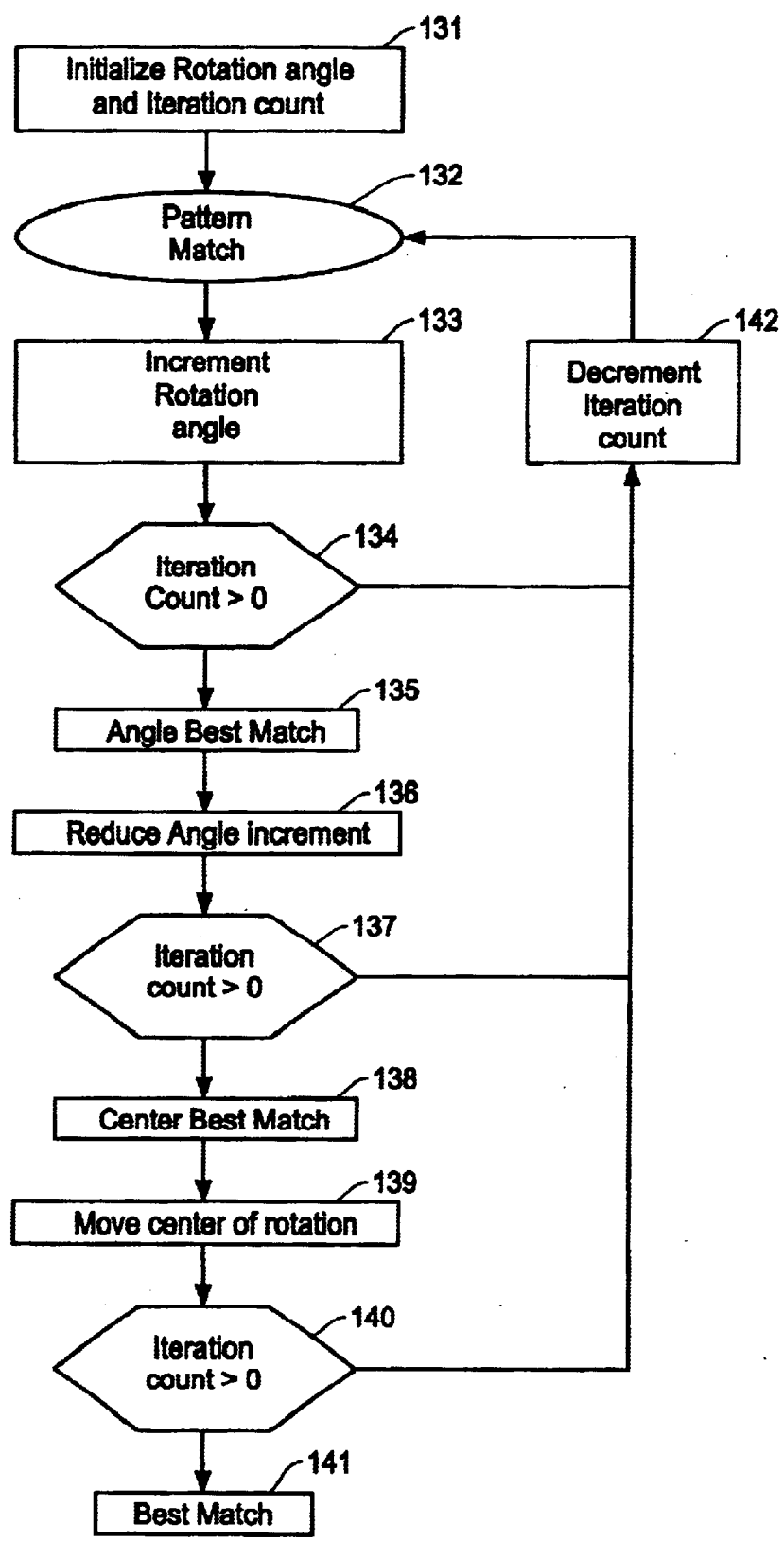
FIG. 17 is a flow chart showing an example of pattern matching sequence including a rotation mode of the present invention.

The function block diagram of FIG. 14 includes a compressed image memory 61f, a compressed template image memory 61g, multipliers 71, 72 and 75, summation units 73 and 75, and a best match correlation computation unit 77. Both inputs of the multiplier 71 receive the compressed image from the memory 61f to produce the self-correlation "rem_img". Similarly, both inputs of the multiplier 72 receive the compressed template from the memory 61g to produce the self-correlation "rem_tmp". The summation unit 73 receives the compressed image from the memory 61f to produce the summation of series of image "sum". Similarly, the summation unit 74 receives the compressed template from the memory 61g to produce the summation of series of template "sum". The multiplier 75 receives the compressed image from the memory 61f and the compressed template from the memory 61g to produce the product of the image and template "fixgi". The results of the calculation are received by the best match correlation computation unit 77 to determine if the current match is better the previous best match. FIGS. 15–17 are flow charts for showing pattern matching operation in the image processing apparatus of the present invention. The flow chart of FIG. 15 is directed to the pattern matching sequence for the scan modes A–E. The pattern matching process starts in the step 101 by initializing the compression ratio and iteration count. In the step 102, pattern matching between the input image and the template is examined by scanning the sub-blocks of the input image. If the match is detected for a certain sub-block, a border of the sub-block is enlarged in the step 103 in a manner shown in FIG. 4.

In the step 104, it is determined whether the iteration count is greater than zero. If the iteration count is zero, then the process determines that the current match is the best match in the step 105. If the iteration count in the step 104 is greater than zero, the process reduces the compression ratio in the step 107 and the pattern matching is further conducted in the step 102 in the reduced compression ratio. At the same time, the process decrements the iteration count by one in the step 106.

The flow chart of FIG. 16 is directed to an example of pattern matching process shifting from one sub-block to the next sub-block of the input image. In the step 111 of FIG. 16, the process determines the self-correlation of template "rem_tmp". Similarly, the process determines the self-correlation of image sub-block "rem_img" in the step 112. Then, the inter-correlation between the template and the input image sub-block "rem_tmp_img" is computed in the step 113. Based on the inter-correlation, regulated (normalized) correlation is computed in the step 114 which is output as current match in the step 115.

In the step 116, the current match from the step 115 is compared with the previous best match. If the current match is no better than the previous best match, the process moves to the step 117 for conducting the pattern matching process for the next image sub-block. In the step 118, it is determined whether the iteration count is greater than zero, and if greater than zero, the process goes back to the step 112 to perform the pattern matching process for the next image sub-block. The iteration count is decremented by one in the step 121. In the step 116, if the current match is better than the previous best match, the best match is updated by replacing the previous best match with the current match in the step 120. In the step 118, if the iteration count is zero, the process determines that the best match in the step 120 is the best match for the current scan mode in the step 119.

The flow chart of FIG. 17 is directed to an example of pattern matching process in the rotation mode of the present invention. In the step 131, the process starts by initializing the rotation angle and iteration count. In the step 132, the pattern matching is examined by computing the inter-correlation between the template and the input image sub-block such as through the steps 111–114 of FIG. 16. The rotation angle is incremented in the step 133. In the step 134, it is determined whether the iteration count is greater than zero, and if it is not, the process goes back to the step 132 for pattern matching computation in the next rotation angle. The iteration count is decremented by one in the step 142. If the iteration count is zero, the process determines that the best match detected so far is the best match of the current rotation range in the step 135.

Then the rotation angle increment is reduced in the step 136. In the step 137, it is determined if the iteration count is greater than zero, and if it is greater than zero, the process goes back to the step 132 to examine the pattern matching for the reduced angle increment. The iteration count is decremented by one in the step 142. If the iteration count is zero, in the step 138, the process determines that the best match detected so far is the best match in the current center of rotation. Then the process moves to the step 139 wherein the center of rotation is shifted such as within 3 pixels shown in FIG. 6A. The iteration count is examined in the step 140 and if there is a remaining iteration count, the process goes back to the step 132 to perform the pattern matching computation. If the iteration count is zero, the process ends in the step 141 producing the best match in the rotation mode.

According to the present invention, the image processing apparatus and method is capable of detecting pattern matching between an input image and a reference image (template) at high speed within a short period of time by incorporating the compression process for the input image and the template before the pattern matching computation. The image processing apparatus performs a pattern matching procedure through a plurality of pattern matching modes with different degree of compression. The pattern matching is performed in the order from the coarse pattern matching mode (higher compression) to the fine pattern matching mode (lower compression and no compression) to decrease an overall time for detecting a best match between the input image and the template. The time required for the compression process is also decreased by incorporating parallel processing techniques such as vector processing memory banking and interleaved memory banking.

Although only a preferred embodiment is specifically illustrated and described herein, it will be appreciated that many modifications and variations of the present invention are possible in light of the above teachings and within the purview of the appended claims without departing the spirit and intended scope of the invention.

What is claimed is:

1. An image processing apparatus for detecting pattern matching between an input image and a template image, comprising:

a first memory for storing a reference pattern as a template;

a second memory for storing an input image for which pattern matching with the template is to be detected;

means for compressing both the template from the first memory and the input image from the second memory by a same predetermined compression ratio;

a compressed data memory for storing the compressed input image and the compressed template from the compressing means; and a main processor for computing inter-correlation between averaged pixel values of the compressed input image and that of the compressed template by scanning the compressed input image for each sub-block thereof and determining a location of the compressed input image showing a best match in a current pattern matching mode;

wherein the current pattern matching mode is one of plural matching modes with different degrees of compression ratio involved in the compression means and the inter-correlation is determined through two or more pattern matching modes in the order from higher compression ratio to lower compression ratio, and wherein a pixel size of the input image from the second memory is gradually increased to properly contain the best match location when it is compressed by the different degrees of compression ratio.

2. An image processing apparatus as defined in claim 1, wherein the plural pattern matching modes include at least three modes having a coarse mode corresponding to the higher compression ratio, a fine mode corresponding to the lower compression ratio, and a mode involving no compression.

3. An image processing apparatus as defined in claim 1, wherein the input image stored in the second memory has a larger number of pixels than that of the template stored in the first memory.

4. An image processing apparatus as defined in claim 1, wherein the pattern matching modes further include a rotation mode wherein either the input image or the template is rotated in a predetermined angle for determining the inter-correlation between the input image and the template by the main processor.

5. An image processing apparatus as defined in claim 1, wherein the pattern matching modes further include a sub-pixel mode wherein the input image sub-block is shifted by one pixel in at least one of left, right, up and down directions for determining sub-pixel adjustment values by using the inter-correlation between the input image sub-block and the template by the main processor.

6. An image processing apparatus as defined in claim 1, wherein each of the first and second memories is configured by a plurality of memory banks for transferring pixel data to the compression means in a parallel fashion or an interleave fashion, thereby increasing an overall data transfer speed.

7. An image processing method for detecting pattern matching between an input image and a template image, comprising the following steps of:

storing a reference pattern in a first memory as a template storing an input image for which pattern matching with the template is to be detected in a second memory;

compressing both the template from the first memory and the input image from the second memory by a same predetermined compression ratio;

storing the compressed input image and the compressed template from the compressing means in a compressed data memory; and computing inter-correlation between averaged ixel values of the compressed input image and that of the compressed template by scanning the compressed input image for each sub-block thereof and determining a location of the compressed input image showing a best match in a current pattern matching mode;

wherein the current pattern matching mode is one of plural matching modes with different degrees of compression ratio involved in the compression means and the inter-correlation is determined through two or more pattern matching modes in the order from higher compression ratio to lower compression ratio; and wherein a pixel size of the input image from the second memory is gradually increased to properly contain the best match location when it is compressed by the different degrees of compression ratio.

8. An image processing method as defined in claim 7, wherein the step of computing the inter-correlation between the input image and the template includes a step of computing summation and self-correlation of the template and summation and self-correlation of the input image sub-block.

9. An image processing method as defined in claim 7, wherein the plural pattern matching modes include at least three modes having a coarse mode corresponding to the higher compression ratio, a fine mode corresponding to the lower compression ratio, and a mode involving no compression.

10. An image processing method as defined in claim 7, wherein the input image stored in the second memory has a larger number of pixels than that of the template stored in the first memory.

11. An image processing method as defined in claim 7, wherein the pattern matching modes further include a rotation mode wherein either the input image or the template is rotated in a predetermined angle for determining the inter-correlation between the input image and the template by the main processor.

12. An image processing method as defined in claim 7, wherein the pattern matching modes further include a sub-pixel mode wherein the input image sub-block is shifted by one pixel in at least one of left, right, up and down directions for determining sub-pixel adjustment values by using the inter-correlation between the input image sub-block and the template by the main processor.

13. An image processing method as defined in claim 7, wherein each of the first and second memories is configured by a plurality of memory banks for transferring pixel data to the compression means in a parallel fashion or an interleave fashion, thereby increasing an overall data transfer speed.

* * * * *